(No Model.)

W. H. WARD.
CAR WHEEL.

No. 246,925. Patented Sept. 13, 1881.

Witnesses:
W. H. H. Knight
Floyd Norris

Inventor:
W. H. Ward
by Johnson & Johnson
his Att'ys

UNITED STATES PATENT OFFICE.

WILLIAM H. WARD, OF PITTSBURG, PENNSYLVANIA.

CAR-WHEEL.

SPECIFICATION forming part of Letters Patent No. 246,925, dated September 13, 1881.

Application filed January 14, 1881. (No model.)

*To all whom it may concern:*

Be it known that I, WILLIAM HENRY WARD, a citizen of the United States, residing at Pittsburg, in the county of Allegheny and State of Pennsylvania, have invented new and useful Improvements in Railway-Car Wheels, of which the following is a specification.

My invention relates to improvements on what are known as "compound" railway-wheels, in which metal and wood are so united in the construction of the wheel as to relieve it and the rail of the concussive strain to which they are subjected, and thereby prevent the crystallization of the metal which is a consequence of solid wheels, and to deaden the noise.

More specifically, my improvement relates to such wheels in which the sectional packing of wood is interposed between the body of the wheel and the metallic tire to form a cushion to the wheel; and the objects of my improvements are to provide for giving a firm cushioned bearing to the tire at its unflanged edge, and to produce a safe and durable wheel in which wooden tongued sections are driven circumferentially into a groove in the body of the wheel. The tongues of the wood ring forming sections are of such form as to be driven into a corresponding groove in the body of the wheel, so that the sections will be solidly joined one with the other and in the entire ring with such tightness as to retain them in such position for being turned off circumferentially and at their ends. This result can only be obtained by the construction by which the wood sections are driven into the groove by blows or pressure force upon their backs, thus rendering the wood ring-packing firm; in keeping its shoulders tight during the shrinkage of the tire upon the wood ring and during its use. The tire is formed with an interior sloping or beveled projection at its unflanged edge, and the wood ring-packing is turned with a corresponding sloping or beveled back. The tire is steam-heated and shrunk upon the wood ring, and secured by a split ring sprung into a groove in the tire and fastened by a single screw-bolt, which also secures the split ends of said ring. The inserting of the wood rings into the wheel-groove from the circumference instead of from the side of the wheel allows the corners of the tongues and of the wheel-groove to be either angular or rounded.

Figure 1:
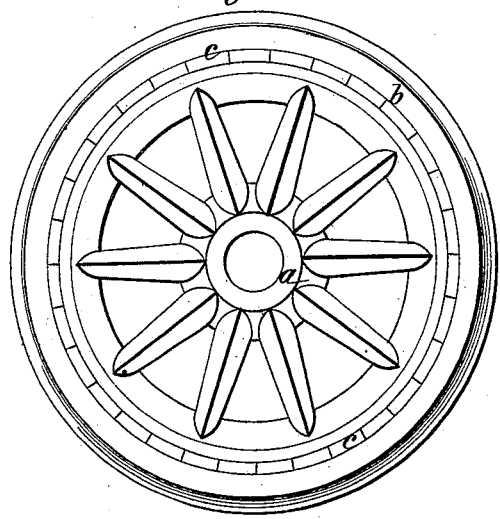
Figure 3:
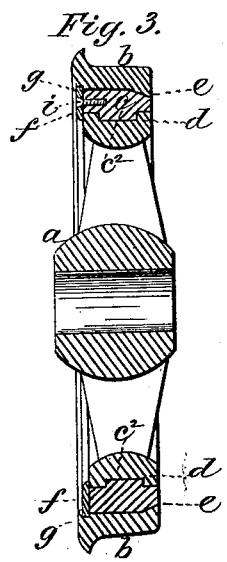
Figure 2:
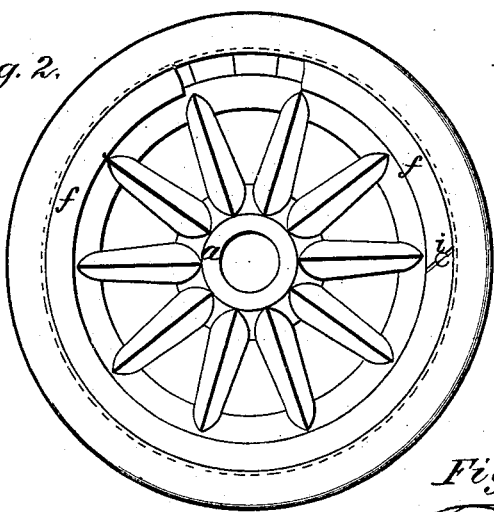
Figure 6:
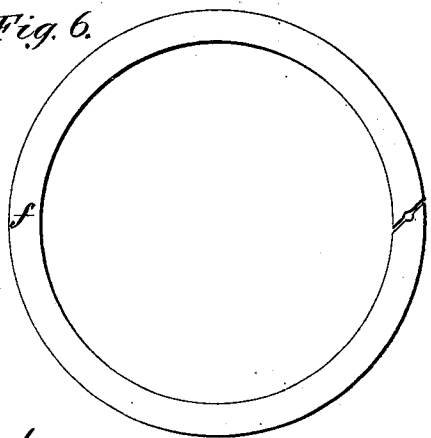
Figure 5:
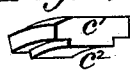
Figure 4:
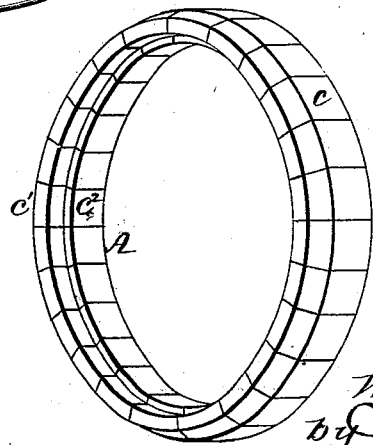

Referring to the accompanying drawings, Figure 1 represents the unflanged side of the wheel; Fig. 2, the flanged side; Fig. 3, a section; Fig. 4, the tongued ring-packing; Fig. 5, one of the tongued sections of said packing-ring; Fig. 6, the locking-ring for the tire, and Fig. 7 a modification of the means for securing the locking-ring.

The body $a$ of the wheel may be of any suitable construction, but the tire $b$ is adapted to be shrunk upon a wooden packing, $c$, which covers the circumference of the body of the wheel. Circumferentially and uninterruptedly the body of the wheel is formed with a groove, $d$, while the inner surface of the tire at its unflanged edge has a sloping or beveled interior projection, $e$, the sloping of which is toward the axis of the wheel, for a purpose to be presently described.

Figure 7:

The packing is formed of matching sections of wood, $c'$, each with a projection, $c^2$, from one side, so that when the sections are joined to form an unbroken ring these projections will form a continuous tongue, A, on the inner side of the ring, but not at either edge thereof. The tongue-projections $c^2$ of these packing-sections are adapted to be driven tightly into the groove $d$ of the wheel, so that when the packing-ring is thus completed its tongue part will be radially in line with the body of the wheel, and therefore afford an additional cushioning in the line of the greatest concussive strain upon the wheel, while the less thick edge portions on each side of the tongue extend to the sides of the wheel, and thereby cushion the tire its full width. The completed packing-ring is then turned to a diameter and shape in cross-section corresponding to the inner side of the tire, which is then steam-heated and forced over and upon the wood packing, upon which it shrinks and forms a solidly-bound union, the sloping interior of the tire joining the sloping back of the packing, so that lateral strain upon the tire toward its flanged side will be resisted by this sloping joining with the packing, and the tongue of the latter will resist such strain upon said packing. The tire is supported against lateral strain toward the unflanged side of the wheel by a ring, $f$, which is sprung into a groove, $g$, formed in the interior side of the tire and under the flange. Said ring extending over the packing laps with the body of the wheel, so that the tire cannot be displaced from its wood cushion. By means of the tongue of the packing the latter cannot be affected injuriously by any lateral strain upon it. The ring is split obliquely, and is secured in its locking position by a screw, $i$, passed through at its joining ends and into the wood packing. The securing of the locking-ring at this point is important to prevent the split ends from sagging or falling out of the tire-groove. The head of this screw is countersunk in the ring. I may, however, use a clamping-bolt passed entirely through the wood packing and secured by a nut, $n$, on the outer side of the wheel, and this is deemed the preferable way as insuring greater security to the locking-ring, which is about two inches wide and less than a half-inch thick, as shown in Fig. 7.

The wood sections are joined in the manner of the staves of a barrel, but with parallel sides, and it is best that the tongue-projection of each should also join; but this is not essential, as the function of the tongue is not due to its continuity, but to its capacity to increase the cushioning function without increasing the space between the tire and the body of the wheel.

It is important to notice that the wearing track tread portion of the tire is directly in radial line with the tongue of the packing, and that the jarring is taken up by this tongue portion of the packing in a much greater degree than is possible with staves of equal thickness.

It is also important to notice that the sloping of the tire at its interior unflanged edge gives a firm and solid bearing upon the packing to the edge of the tire, and, moreover, this construction avoids the bruising and other injury arising from angular joints of wood and iron in railroading. Nor is the ring locked to the body of the wheel except through the packing; nor could such locking be thus effected except by the locking-tongue of the packing, and this construction renders it very easy to apply and to safely secure the ring within the tire-groove.

I claim—

1. The wheel constructed substantially as herein described, consisting of the tire formed with an interior sloping or beveled projection, $e$, at its unflanged edge, the wood ring-packing $c$, of tongued sections turned with a corresponding sloping or beveled back, the body of the wheel having a circumferential groove, the split ring $f$, sprung into a groove, $g$, in said tire and fastened by a single screw, $i$, the said tire being steam-heated and shrunk upon the ring-packing, and the said tongued sections driven circumferentially into the wheel-groove, all constructed substantially as shown and described.

2. In a compound wheel in which a wood packing having an interior tongue is interposed between the body of the wheel and the tire, the said tire formed with the sloping or beveled projection $e$ on its interior, and the said packing formed with a corresponding sloping or beveled back, whereby a firm and solid bearing is given the tire and its unflanged edge, substantially as described, for the purpose specified.

3. The wood ring-packing of a compound wheel formed with an interior projecting tongue, the body of the wheel formed with a corresponding circumferential groove, and the tire formed with an interior sloping or beveled projection, $e$, at its unflanged edge, and a groove, $g$, at its flanged edge, substantially as described, in combination with the ring and its securing-bolt $i$, passing into or through said packing, substantially as described, for the purpose specified.

4. A compound wheel for railway-cars, consisting of the tire $b$, having the interior sloping or beveled projection $e$ and the groove $g$, and the body of the wheel having a circumferential groove, $d$, the wood packing $c$, formed with an interior projecting tongue, $c^2$, the ring $f$, and its securing screw-bolt $i$, substantially as described, for the purpose specified.

In testimony whereof I have hereunto set my hand in the presence of two subscribing witnesses.

W. H. WARD.

Witnesses:
A. E. H. JOHNSON,
J. W. HAMILTON JOHNSON.